United States Patent
Berger

(10) Patent No.: US 7,243,633 B2
(45) Date of Patent: Jul. 17, 2007

(54) HEV INTERNAL COMBUSTION ENGINE PRE-POSITIONING

(75) Inventor: Al Berger, Brownston, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/112,652

(22) Filed: Apr. 22, 2005

(65) Prior Publication Data
US 2006/0241851 A1 Oct. 26, 2006

(51) Int. Cl.
F02D 13/06 (2006.01)
(52) U.S. Cl. .................. 123/198 F; 123/90.16
(58) Field of Classification Search .......... 123/198 F, 123/90.16, 198 DB
See application file for complete search history.

(56) References Cited

U.S. PATENT DOCUMENTS

| | | | |
|---|---|---|---|
| 6,098,585 A * | 8/2000 | Brehob et al. ........... 123/179.5 |
| 6,453,864 B1 * | 9/2002 | Downs et al. ............. 123/179.3 |
| 6,550,239 B2 * | 4/2003 | Almkvist et al. .............. 60/284 |
| 6,616,570 B2 * | 9/2003 | Wakashiro et al. ............ 477/5 |
| 6,647,955 B1 * | 11/2003 | Sieber ......................... 123/322 |
| 6,687,603 B2 * | 2/2004 | Wakashiro et al. .......... 701/110 |
| 6,691,654 B2 * | 2/2004 | Uehara et al. ........... 123/90.16 |
| 6,807,934 B2 * | 10/2004 | Kataoka et al. ........... 123/179.4 |
| 6,886,649 B2 * | 5/2005 | Wakashiro et al. ......... 180/65.2 |
| 6,939,263 B2 * | 9/2005 | Wakashiro et al. ............. 477/3 |
| 6,950,739 B2 * | 9/2005 | Matsubara et al. .......... 701/103 |
| 6,953,021 B2 * | 10/2005 | Wakashiro et al. .......... 123/321 |
| 6,990,938 B2 * | 1/2006 | Inomoto et al. .......... 123/90.16 |
| 7,032,545 B2 * | 4/2006 | Lewis et al. ................... 123/21 |
| 2004/0149251 A1 | 8/2004 | Nishikawa et al. |
| 2004/0159297 A1 | 8/2004 | Kataoka et al. |

* cited by examiner

Primary Examiner—Stephen K. Cronin
Assistant Examiner—Jason Benton
(74) Attorney, Agent, or Firm—Allan J. Lippa; Alleman Hall McCoy Russell & Tuttle LLP

(57) ABSTRACT

A method for controlling an engine that operates with negative valve overlap between an intake valve and an exhaust valve during at least some conditions, the method comprising of providing an engine stop position with at least one cylinder near top dead center of piston position and adjusting at least one of the intake valve and the exhaust valve to position the at least one of the intake and exhaust valves of said at least one cylinder so that the at least one of said intake and exhaust valves is substantially closed at said engine stop position.

19 Claims, 5 Drawing Sheets

HEV INTERNAL COMBUSTION ENGINE PRE-POSITIONING

FIELD

The present application relates to stopping and starting engines coupled in hybrid powertrains of vehicles.

BACKGROUND AND SUMMARY

Vehicles having hybrid powertrains may be used where the engine is periodically shut-off during vehicle operation to improve overall fuel economy. In one example approach, the engine may be pre-positioned to obtain a desired engine position for future starts. In one example, the desired pre-position is with at least one cylinder near TDC (end of compression/beginning of expansion) for a 4-cylinder, even firing, 4-cycle engine with cam actuated valves.

However, the inventor herein has recognized at least the following issues with such an approach. For example, positioning a cylinder near TDC (end of compression/beginning of expansion) often results in another cylinder being positioned near its TDC (end of exhaust/beginning of intake) and having both intake and exhaust valves at least partly open. This condition creates a path from the intake, through the cylinder, to the exhaust. In other words, there is communication between the intake and exhaust manifolds. This condition can result in oxygen migration from the intake manifold, cylinder, or exhaust to the catalyst during engine-off conditions, thereby saturating the catalyst with excess oxygen. The migration can be exacerbated by emission testing conditions, which can draw exhaust flow even when the engine is off. This flow of air through the catalyst can also cool the catalyst to below its optimal operating temperature.

At least some of the above issues may be addressed by a method for controlling an engine that operates with negative valve overlap between an intake valve and an exhaust valve during at least some conditions, the method comprising: providing an engine stop position with at least one cylinder near top dead center of piston position; and adjusting at least one of the intake valve and the exhaust valve to position the at least one of the intake and exhaust valves of said at least one cylinder so that the at least one of said intake and exhaust valves is substantially closed at said engine stop position.

In this way, it may be possible to provide improved restarting of the engine, yet reduce the potential for migration of oxygen from the intake and/or engine cylinders to the exhaust catalyst system.

DETAILED DESCRIPTION

Figure 1:
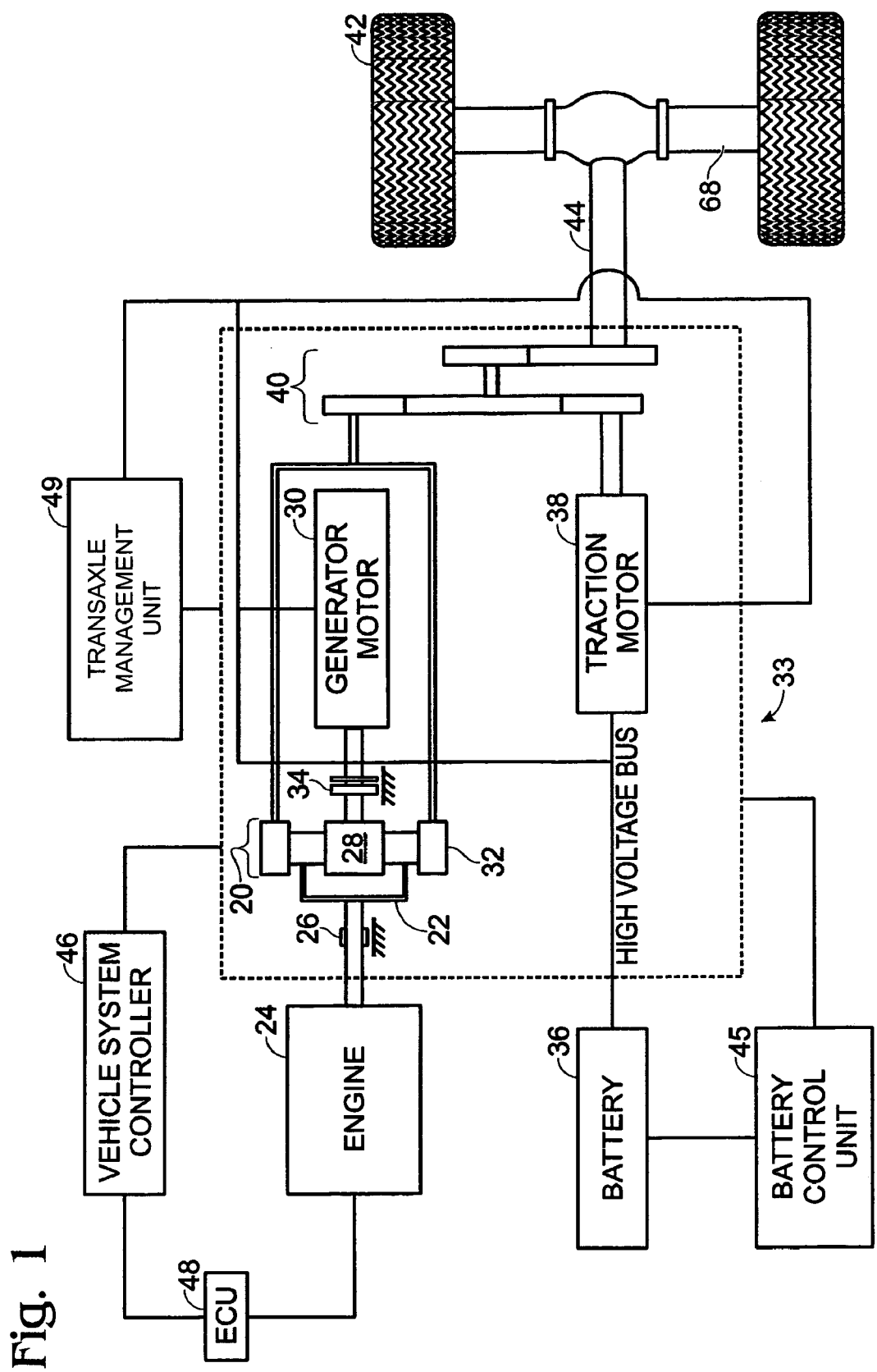
FIG. 1 is a schematic diagram of an engine in an example hybrid powertrain.

The present disclosure relates to electric vehicles and, more particularly, hybrid electric vehicles (HEVs). FIG. 1 demonstrates just one possible configuration, specifically a parallel/series hybrid electric vehicle (split) configuration.

In an HEV, the engine 24 is coupled to the planet carrier 22 of planetary gear set 20. A one way clutch 26 allows forward rotation and prevents backward rotation of the engine and planet carrier. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

Thus, FIG. 1 shows that in this example, the engine 24 is attached directly to planet carrier 22, for example without a clutch that can disconnect them from each other. One way clutch 26 allows the shaft to rotate freely in a forward direction, but grounds the shaft to the powertrain's stationary structure when a torque attempts to rotate the shaft backwards. Brake 34 does not interrupt the connection between the sun gear 28 and the generator motor 30, but can, when energized, ground the shaft between those two components to the powertrain's stationary structure.

A vehicle system controller (VSC) 46 controls many components in this HEV configuration by connecting to each component's controller. An engine control unit (ECU) 48 connects to the Engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardwire interface. The TMU 49 controls the generator motor 30 and the traction motor 38 via a hardwire interface. The control units 46, 48, 45 and 49, and controller area network 33 can include one or more microprocessors, computers, or central processing units; one or more computer readable storage devices; one or more memory management units; and one or more input/output devices for communicating with various sensors, actuators and control circuits.

Figure 2:
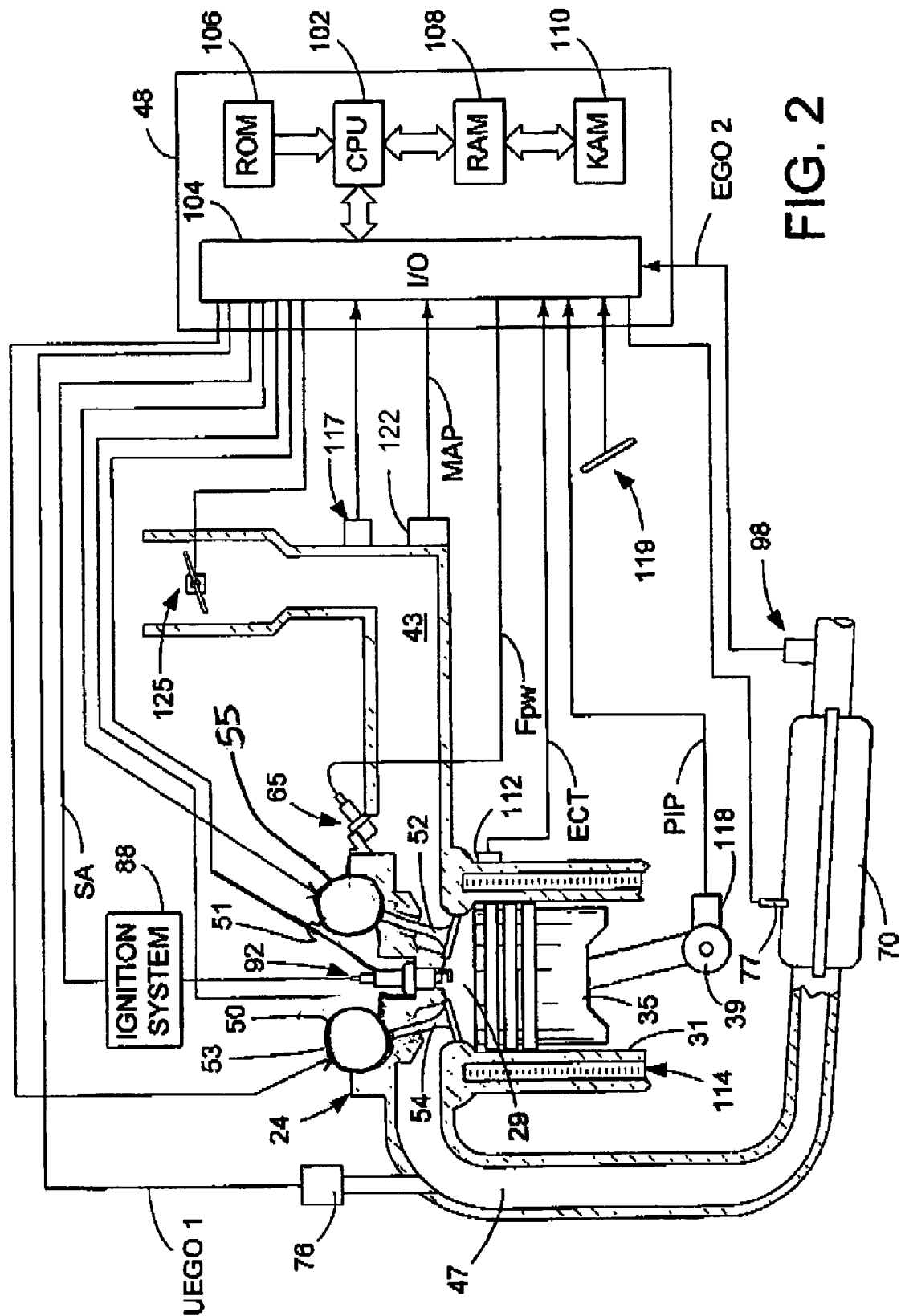
FIG. 2 is a schematic diagram of an engine, intake system, and exhaust system.

FIG. 2 shows an example engine and exhaust system that may be used as engine 24. Engine 24 may be a gasoline engine or a diesel engine. The example of FIG. 2 shows a gasoline engine with a spark plug, however, engine 24 may be a diesel engine without a spark plug, or any other type of engine. Internal combustion engine 24, comprising a plurality of cylinders, one cylinder of which is shown in FIG. 2, is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 an exhaust valve 54. While only one intake and exhaust valve is shown, more than one may be used if desired. For example, two intake valves and a single exhaust may be used.

In this example, variable valve timing may be provided by variable cam timing. While in this example, independent intake cam timing and exhaust cam timing is shown, variable intake cam timing may be used with fixed exhaust cam timing, or vice versa. Also, various types of variable valve timing may be used, such as the hydraulic vane-type actuators 53 and 55 receiving respective cam timing control signals VCTE and VCTI from controller 48. Cam timing (exhaust and intake) position feedback can be provided via comparison of the crank signal PIP and signals from respective cam sensors 50 and 51.

In an alternative embodiment, cam actuated exhaust valves may be used with electrically actuated intake valves, if desired. In such a case, the controller can determine whether the engine is being stopped or pre-positioned to a condition with the exhaust valve at least partially open, and if so, hold the intake valve(s) closed during at least a portion of the engine stopped duration to reduce communication between the intake and exhaust manifolds.

Intake manifold 43 is also shown having fuel injector 65 coupled thereto for delivering liquid fuel in proportion to the pulse width of signal FPW from controller 48. Fuel is delivered to fuel injector 65 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 43 is shown communicating with optional electronic throttle 125.

Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. Alternatively, a two-state exhaust gas oxygen sensor may be substituted for UEGO sensor 76. Two-state exhaust gas oxygen sensor 98 is shown coupled to the exhaust system downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof. Converter 70 can include multiple catalyst bricks, in one example. In another example, multiple emission control devices, each with multiple bricks, can be used. Converter 70 can be a three-way type catalyst in one example.

Controller 48 is shown in FIG. 2 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In one aspect of the present description, engine position sensor 118 produces a predetermined number of equally spaced pulses every revolution of the crankshaft from which engine speed (RPM) can be determined.

In an alternative embodiment, a direct injection type engine can be used where injector 65 is positioned in combustion chamber 29, either in the cylinder head similar to spark plug 92, or on the side of the combustion chamber.

As noted above, in one example, when engine 24 is shut off, crankshaft 39 may be rotated to a position that puts one of the cylinders very near top dead center (TDC), end of compression. In this way, the engine may be easier to restart (at the initiation of cranking, the crankshaft of an engine in this position can get up to speed faster because very little of the initial cranking energy is absorbed by compression of air within a cylinder. Also, in the case of an even firing 4-cylinder, four stroke engine, when engine crank is initiated from a substantially TDC condition, a minimal amount of the cranking energy during the first few degrees of crankshaft rotation is absorbed by acceleration of the piston masses). In other words, in the example of a 4-cylinder engine, it would normally stop with one cylinder after TDC, compression, and the next cylinder approximately the same distance before its TDC, compression, to balance the spring forces of compression of gasses in the cylinders. On an engine with an even number of cylinders, this normal stop position is highly unlikely to have any cylinder at valve overlap. However, this stop position may be an unfavorable position for quick restart of the engine. Thus, in one example, pre-positioning may be used as noted above, which may be accomplished via torque created by generator motor 30 to rotate the crankshaft to put a piston slightly before TDC and one-way clutch 26 that prevents the crankshaft from rotating backwards.

However, on a four stroke engine with an even number of cylinders and an even firing interval, whenever one cylinder is at TDC, end of compression, another cylinder is at TDC, end of exhaust, as shown below in more detail with regard to FIG. 3. Depending on the engine's valve event timing, the cylinder at TDC, end of exhaust, may be at a position of valve event overlap, with the exhaust valve not yet completely closed and with the intake valve already starting to open as shown below with regard to FIG. 4. If at least one cylinder of an engine is at a valve overlap position when the engine is not running, it is possible to have air pass from the intake manifold to the exhaust manifold through that cylinder. This can increase emissions, especially in a lean (gasoline or diesel) HEV. For example, it can introduce excess oxygen into an emission control device, such as a NOx trap, causing a degradation of the system performance and an increase of exhaust emissions.

Thus, in one approach, adjustments are made so that the engine is not stopped (or at least stopped less often) and left in a position where any cylinder has both the exhaust and the intake valves partially open. This can be achieved in various ways, such as, for example: 1) Exhaust variable valve timing (VVT) can be adjusted before, during, or after, engine shut-down to eliminate or reduce valve overlap in the shut-down condition; 2) Intake VVT can be adjusted before, during, or after, engine shut-down to eliminate or reduce valve overlap in the shut-down condition; 3) (in the case of a 4-cylinder 4-cycle engine) a pre-positioning strategy can be configured to position all pistons far enough from TDC, end of exhaust, where the valve overlap occurs, to make sure that the intake valve of the cylinder nearest TDC, exhaust, has not yet begun to open.

Further, combinations of these approaches may be used. Note also that under approach 3, different stopping locations may be desired for different engine types, such as V-type engines, engines of more or fewer cylinders, etc. As an example of approach 3, the motor may be controlled to position a cylinder far enough before its TDC, compression that the corresponding cylinder that is approaching TDC, exhaust, still has its intake valve closed. The compressed air within the cylinder that is approaching TDC, compression, would tend to make the crankshaft rotate backwards, but one-way clutch 26 would prevent backwards rotation of the crankshaft. This new position could be almost as favorable for quick restart, while reducing communication between the intake and exhaust manifold.

Figure 3:
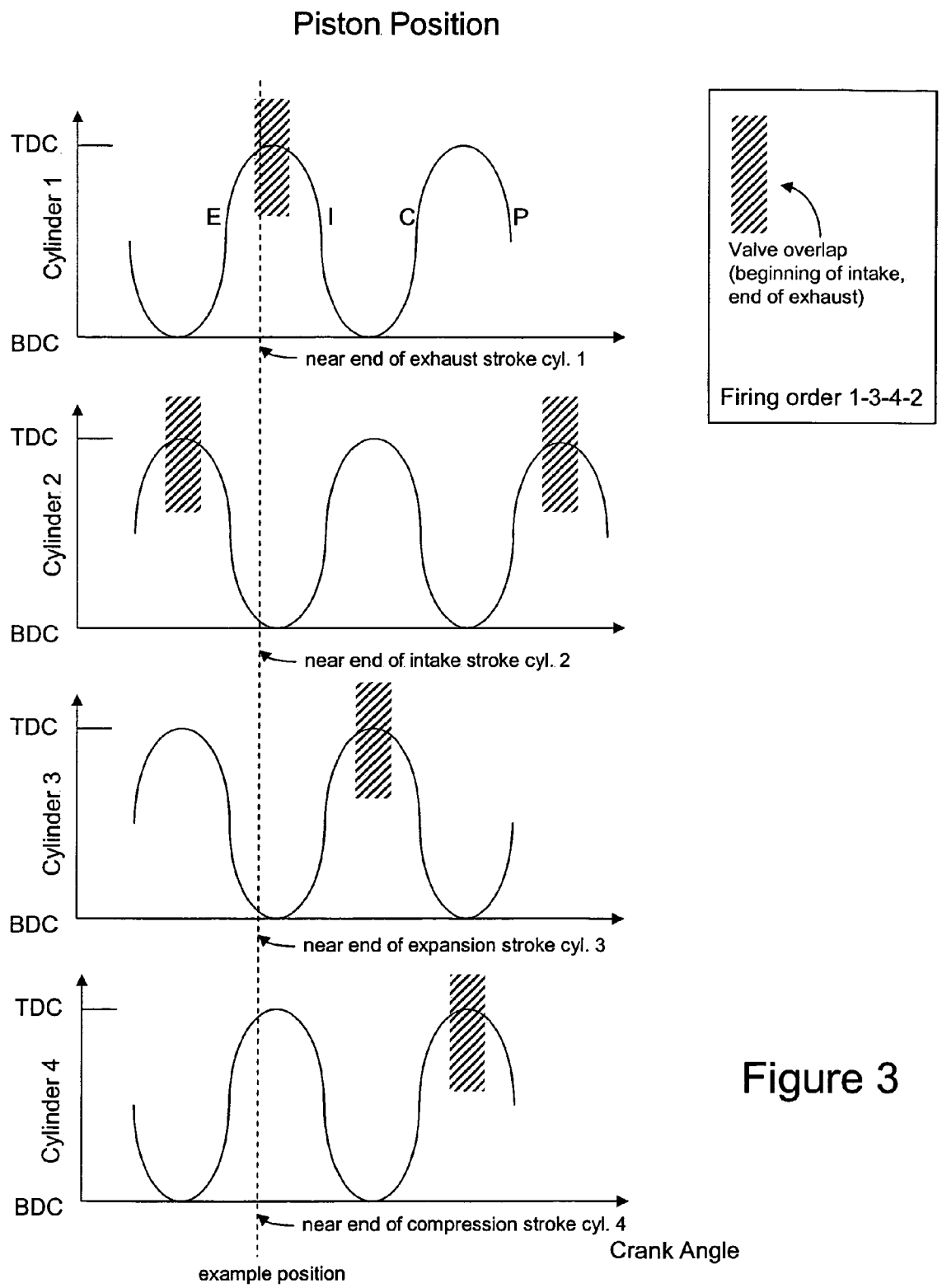
FIG. 3 is a diagram of relative engine piston positions for a four cylinder four cycle engine.

Referring now to FIG. 3, it shows piston positions for each cylinder of a four cylinder four cycle engine. The hatched region indicates the location where there is potential for valve overlap between the intake and exhaust valve(s). The figure also shows the relative position of the pistons. Note that if the controller attempts to stop the crankshaft at exactly TDC, a positioning tolerance of ±2.5 degrees may occasionally put the crankshaft in a position where the gas pressure can create enough positive torque to make the crankshaft continue rotating too far forward. Thus, in one example engine stopping control, such as in the absence of variable valve timing, the crankshaft is stopped far enough before TDC so that the intake valve has not yet begun opening. The one way clutch 26 can prevent the crankshaft from rotating backwards and hold it in that position without consuming any energy, such as could occur with an electronically actuated valve being held in the closed position.

Figure 4:
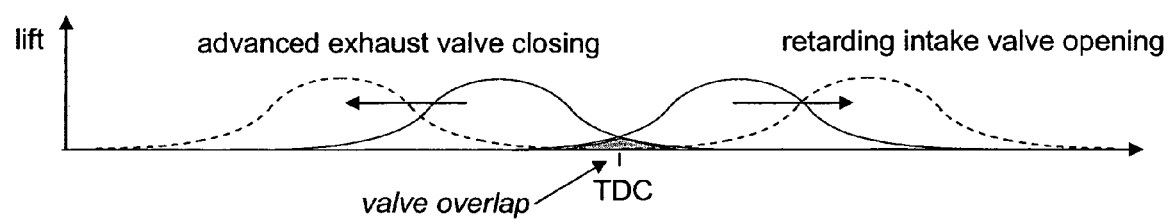
FIG. 4 shows a graph illustrating intake and exhaust valve lift for a cylinder with the potential for valve overlap.

Referring now to FIG. 4, it shows an example condition of valve overlap between the intake and exhaust valve(s). Specifically, an intake and exhaust valve lift profile (solid lines) is shown where the tails of the lift profile overlap. As indicated in FIG. 4 by the dashed lift profiles, advancing of the exhaust valve closing (approach 1) and/or retarding of the intake valve opening (approach 2) can be used to reduce valve overlap.

As will be appreciated by one of ordinary skill in the art, the specific routines described below in the flowchart may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one or more of the illustrated steps or functions may be repeatedly performed depending on the particular strategy being used. Further, these Figures graphically represent code to be programmed into the computer readable storage medium in controller 48.

Figure 5:
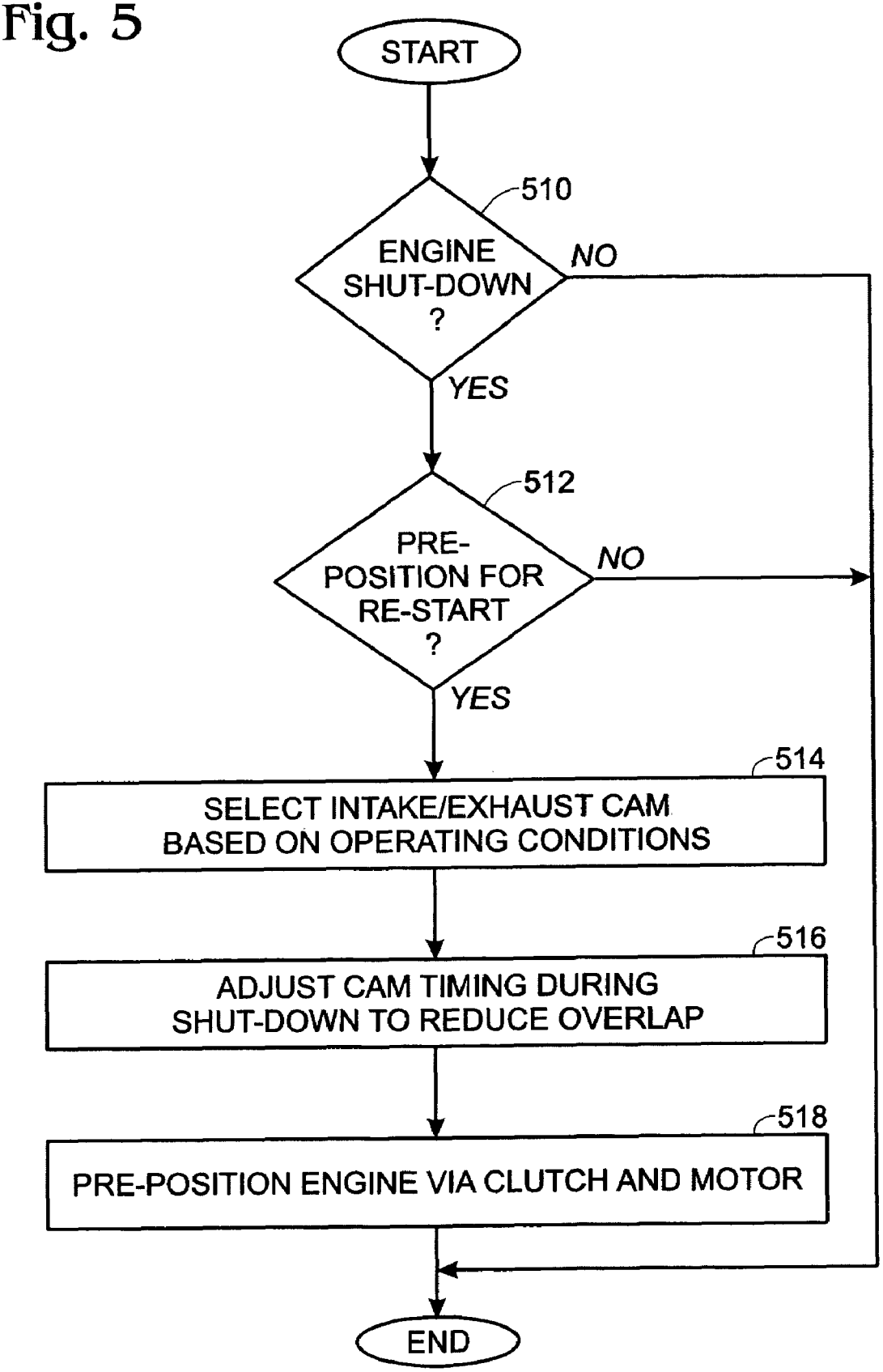
FIG. 5 shows a high level flowchart of an example embodiment of operation.

Referring now to FIG. 5, an example routine is shown using at least one of approaches 1 and 2. In this example, one or both of intake and/or exhaust valve cam timing is adjusted before, during, or after engine shut-down to position the valves in a no (or reduced) valve overlap condition, so that no matter where the engine is stopped or pre-positioned, communication from the intake to the exhaust is reduced.

Specifically, in step 510 the routine determines whether engine shut-down conditions are requested, occurring, and/or about to occur. These conditions can be identified in a variety of ways, such as via an engine key-off, a request to stop the engine from the vehicle system controller, or others. If shut-down conditions are present, the routine continues to step 512. In step 512 the routine optionally determines whether pre-positioning of the engine for future starts is requested. If so, the routine continues to step 514 to select the valve timing to adjust so that valve overlap can be reduced during engine-off conditions. The selection of whether intake and/or exhaust valve timing is adjusted can be based on various parameters, such as the estimated engine off time, engine temperature, ambient temperature, catalyst temperature, and various others.

Then, in one example, cam timing can be adjusted during engine shut-down conditions while oil pressure is still present from the engine operation during step 516. In one specific example, valve timing can be adjusted before discontinue fuel and/or spark to the cylinders (e.g., before a last combustion event) to start moving cam timing to a desired position to reduce valve overlap.

In another example, the design of the cam actuators is such that when oil pressure is removed (e.g., due to engine shut-down), a spring bias force is used to position the cams in a position that reduces valve overlap automatically.

Continuing with FIG. 5, in step 518 the routine pre-positions of the engine via the motor and one-way clutch to obtain a desired position for later starting. The pre-position may occur via the motor/generator after the engine has terminated operation, or may be obtained by controlling the engine during the shut-down to stop at a desired location, or combinations thereof. In another example, the engine and generator motor torques can be controlled during shut-down to obtain a desired stopping location, such as by adjusting fuel, spark, air, current flow to or from the generator motor, and/or combinations thereof.

In one example, the engine is positioned with at least one cylinder with a piston near TDC, end of compression/beginning of expansion. Then, when a request to start the engine is provided, the engine can be started from the position set in 518. In one example, the valve timing can be adjusted during the start to a desired condition which may or may not include valve overlap. For example, during starting, valve overlap may be generated or increased. As another example, after the engine is initially rotated by the starter (and sufficient oil pressure is generated), valve timing can be adjusted away from the position set in step 518 so that a different valve timing can be used for the first and subsequent combustion events of the engine start.

Note that in an alternative embodiment, the engine pre-positioning may be performed to position the engine such that none of the engine cylinders are left in a position with a valve overlap condition. For example, the engine pre-positioning may be performed to position the engine with at least one cylinder near TDC, end of exhaust, but before the intake valve opening occurs. In this way, it may be possible to obtain some improved starting ability while at the same time reducing communication between the intake and exhaust manifolds during engine stopped conditions.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types, as noted above. Also, the approaches described above are not specifically limited to hydraulically actuated variable cam timing actuators. Rather, they could be applied to other forms of actuators.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine that operates with negative valve overlap between an intake valve and an exhaust valve during at least some conditions, the method comprising:
   providing an engine stop position with at least one cylinder near top dead center of piston position at each engine shutdown;
   adjusting at least one of the intake valve and the exhaust valve to position the at least one of the intake and exhaust valves of said at least one cylinder so that the at least one of said intake and exhaust valves is substantially closed at said engine stop position.

2. The method of claim 1 wherein said engine stop position is provided by adjusting an engine operating parameter during an engine shut-down operation.

3. The method of claim 1 wherein said engine stop position is provided by adjusting an engine position via an electric motor coupled to the engine.

4. The method of claim 1 wherein said engine stop position is provided by adjusting an engine position through an electric motor coupled to the engine and holding that position with a one-way clutch.

5. The method of claim 1 wherein said engine stop position is provided by adjusting an engine position during an engine stopped condition via an electric motor coupled to the engine and holding that position with a one-way clutch.

6. The method of claim 1 wherein said adjusting is carried out at least during an engine shut-down.

7. The method of claim 1 wherein said adjusting is carried out at least after the engine is stopped.

8. The method of claim 1 wherein said adjusting includes adjusting one of the intake valve opening timing and exhaust valve closing timing.

9. The method of claim 1 wherein said adjusting includes retarding intake valve opening timing.

10. The method of claim 1 wherein said adjusting includes advancing exhaust valve closing timing.

11. The method of claim 1 wherein said adjusting includes adjusting a position of an electric valve actuator coupled to the at least one of said intake and exhaust valves to hold the valve substantially closed.

12. The method of claim 11 wherein each intake valve in the at least one cylinder is electrically actuated, and said adjusting includes holding each intake valve substantially closed.

13. A system for controlling a hybrid electric vehicle, the system comprising:
   an engine with a plurality of cylinders, wherein at least one cylinder operates with negative valve overlap between an intake valve and an exhaust valve during at least some conditions;
   an electric motor/generator;
   a one-way clutch coupled to the engine's crankshaft; and
   a controller for periodically stopping the engine and operating the motor to drive said vehicle, where, at each engine shutdown, the engine is stopped at an engine stop position with at least one cylinder near top dead center of piston position, said controller adjusting at least one of the intake valve and the exhaust valve to position the at least one of the intake and exhaust valves of said at least one cylinder so that the at least one of said intake and exhaust valves is substantially closed at said engine stop position.

14. The system of claim 13 wherein said controller adjusts intake cam timing to position the intake valve so that the intake valve is substantially closed at said engine stop position.

15. The system of claim 13 wherein said controller adjusts exhaust cam timing to position the exhaust valve so that the exhaust valve is substantially closed at said engine stop position.

16. A computer storage medium having instructions encoded therein for controlling an engine that operates with negative valve overlap between an intake valve and an exhaust valve during at least some conditions, the medium comprising:
   code for providing an engine stop position with at least one cylinder near top dead center of piston position by adjusting an engine position at each engine shutdown through an electric motor coupled to the engine, and holding that position with a one-way clutch; and
   code for adjusting at least one of the intake valve and the exhaust valve to position the at least one of the intake and exhaust valves of said at least one cylinder so that the at least one of said intake and exhaust valves is substantially closed at said engine stop position.

17. The medium of claim 16 wherein said code provides said engine stop position by adjusting said engine position during an engine non-combustion condition.

18. The medium of claim 16 wherein said code adjusts said at least one intake or exhaust valve during an engine shut-down.

19. The medium of claim 16 wherein said code adjusts said at least one intake or exhaust valve by changing cam timing.

* * * * *